June 17, 1947. F. T. HAGUE 2,422,193
METHOD OF MAKING CAST TURBINE BLADING
Filed June 12, 1944
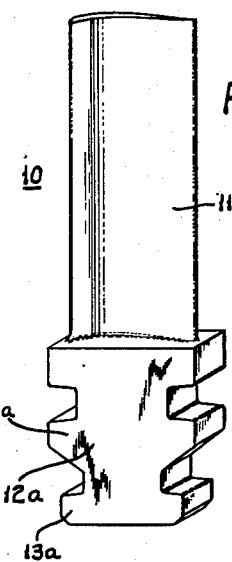
FIG. 1.
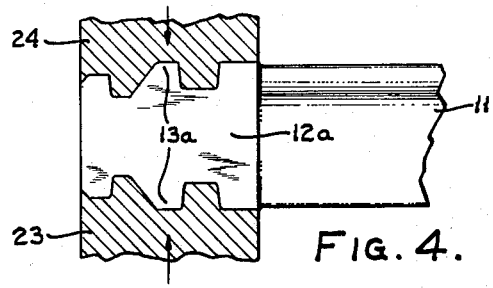
FIG. 4.
FIG. 5.
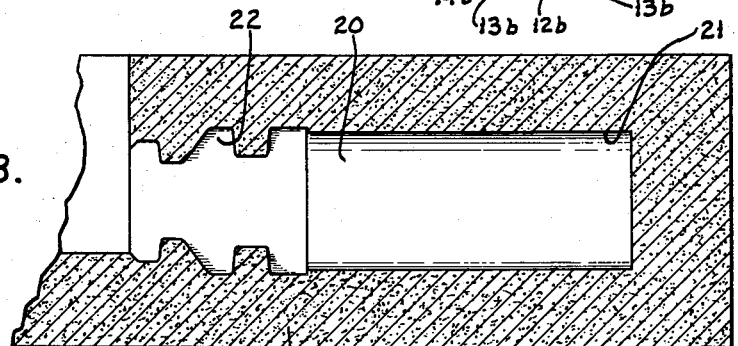
FIG. 3.
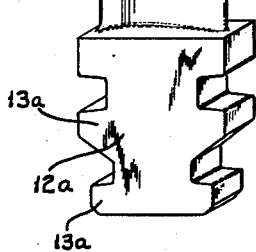
FIG. 2.
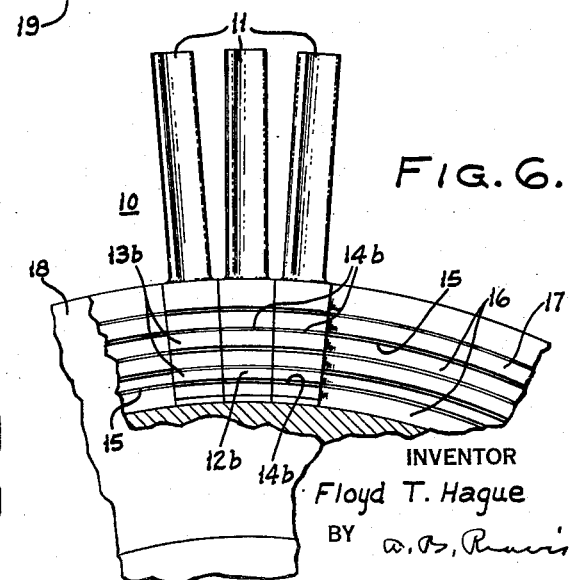
FIG. 6.
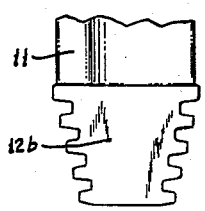
FIG. 7.
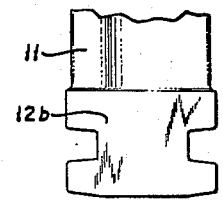
FIG. 8.
INVENTOR
Floyd T. Hague
BY
ATTORNEY Patented June 17, 1947

2,422,193

UNITED STATES PATENT OFFICE 2,422,193

METHOD OF MAKING CAST TURBINE BLADING

Floyd T. Hague, Drexel Hill, Pa., assignor to Westinghouse Electric Corporation, East Pittsburgh, Pa., a corporation of Pennsylvania Application June 12, 1944, Serial No. 539,866

2 Claims. (Cl. 29—156.8)

1

The invention relates to a process of manufacturing blades for turbines, compressors and the like, and it has for an object to cast each blade with finished and smooth blade portion surfaces and with the root portion slightly oversize followed by plastic deformation of the latter to suit a blade-holding groove, this process being advantageous, in general and irrespective of the material used, where it is desired to finish the root-holding abutments with curved surfaces, and, in particular, where high-temperature-resisting alloys, which are difficult to machine or which are non-forgeable, are used for the production of gas turbine blades.

The precision casting process, principles of which are outlined in prior patents and publications, for example, see the patent to Merrick, No. 2,125,080, July 26, 1938, Stoody et al., 2,299,860, October 27, 1942, and Zahn, 2,306,516, December 29, 1942, may be used to advantage in casting blades of the above character, particularly where the blade section varies dimensionally along the length of the blade, where the blade is warped or shaped to provide desired variation in inlet or exit angles, or both, from the root to the tip, or where materials difficult to machine, grind or forge are used.

Precision casting of blading cannot ordinarily be made sufficiently accurate with respect to root size to permit of installation in a blade groove without machining or grinding to size; however, this procedure is inadequate where materials difficult to machine or grind are used or where it is desired to finish the root with circumferentially-curved holding or abutment surfaces. Further, there is the possible impairment of the stress to rupture strength and life of blading because of grinding or machining away of cast surfaces of the root. In accordance with the present invention, instead of grinding or machining of the root and involving the difficulties just pointed out, each blade is precision cast with the root portion slightly oversize, after which the cast root portion is heated and subjected, in forming dies, to plastic deformation sufficient to reduce the root portion to size suitable for the blade-holding groove. Use of the invention in connection with casting of blades having root portions provided with lateral ribs, projections or serrations is particularly desirable because each root portion may be readily deformed sufficiently to give the blade-holding surfaces the proper relative location and circumferential curvature to fit a blade-holding groove with the root portions juxtaposed circumferentially and fitting a blade groove.

2

The foregoing and other objects are effected by the invention as will be apparent from the following description and claims taken in connection with the accompanying drawings, forming a part of this application, in which:

Fig. 1 is an isometric view of a cast turbine blade showing the slightly oversize cast root portion;

Fig. 2 is a plan view of the blade shown in Fig. 1;

Fig. 3 is a diagrammatic view of a mold;

Fig. 4 is a diagrammatic view showing a cast root portion undergoing plastic deformation in forging dies;

Fig. 5 is a fragmentary view showing a blade root;

Fig. 6 is a fragmentary view of a turbine rotor having a blade groove with a plurality of blades of a row arranged therein; and Figs. 7 and 8 are views showing other forms of root portions.

In the drawings, there is shown a turbine or compressor blade, at 10, having a blade portion 11 and a finished root portion 12b (Figs. 5, 6, 7 and 8) provided, in Figs. 5 and 6, with lateral ribs 13b having outer surfaces 14b which abut inner surfaces 15 of the ribs 16 of a blade groove 17 formed in the element or rotor 18, a plurality of blades of a row being shown in Fig. 6 in assembled relation with the root portions juxtaposed circumferentially in the blade groove.

To provide adequate damping and blade-holding strength to cope with high-speed and temperature conditions, each root portion 12b is preferably of the multiple lateral rib or serration type so proportioned as to be suitable to a final sizing operation by pressing with a forging or forming die.

In accordance with the present method, a precision casting process is used to cast each blade, the blade portion 11 being cast in finished form with the root portion, for example, the root portion 12a of Figs. 1 and 2, slightly oversize, particularly in the direction of the width of the blade, as indicated in an exaggerated manner by the material disposed outwardly of the dash lines a—a of Fig. 2. In Fig. 3, there is shown diagrammatically a one-piece mold 19 suitable for casting blades, the mold being characterized by the presence of a blade cavity 20 having a blade portion boundary surface 21 which is uninterrupted by any joint line or lines and which is sufficiently smooth so that the blade portion 11 may be cast in finished form. The blade root portion 22 of the mold is so dimensioned that the cast root portion 12a will be slightly oversize, as just pointed out.

After casting, each blade has its root portion 12a heated sufficiently so that, when subjected to the effect of forming dies 23 and 24, as diagrammatically indicated in Fig. 4, it conforms dimensionally to suit the blade-holding groove, the surfaces of the lateral ribs 13a being thereby shaped and positioned to fit cooperating surfaces of ribs of the groove. In Fig. 5, there is shown a fragmentary view of a turbine blade having a finished root portion 12b, such root portion having lateral ribs or projections 13b provided with outer abutment or shoulder surfaces 14b for cooperation with blade ribs, the finished blade root 12b being of a width suitable to fit accurately the blade groove 17, as shown in Fig. 6. By following this procedure, not only is it assured that the blade width may be made suitable for the blade-holding groove, but the shoulder or abutment surfaces 14b may be curved circumferentially to suit the blade groove ribs with the various abutment surfaces 14b relatively positioned and located so that, with a blade assembled in its groove, the abutment surfaces will engage the groove ribs with the projections or ribs of each root portion each carrying its proper share of the load when under the influence of centrifugal force.

The procedure of casting followed by forming is advantageous in the production of gas turbine blades from high-temperature-resisting alloys, such as Stellite. Such alloys are usually difficult to machine and for all practical purposes are regarded as being none-forgeable; however, they may be subjected to a very slight amount of plastic deformation finishing or shaping in dies without cracking, "plastic deformation," as used herein, having the significance of only a very slight amount of deformation due to the inherent nature of the alloy as contrasted with the very much larger deformation effected by forging with ordinary forgeable alloys. Therefore, in employing the process to produce turbine blades from such alloys, each blade is cast with its root portion slightly oversize and within the limits of plastic deformation of the material so that the root portion may be plastically deformed in dies to bring it to the desired finished form and shape.

While the process is advantageous with any material from the point of view of readily providing curved outer surfaces for the root lateral ribs, irrespective of the number of ribs at each side, in accordance with another aspect of the invention, where high-temperature-resisting alloys are used, I prefer to have a plurality of ribs, projections or serrations at each side because of the root damping thereby secured. In Figs. 1 to 6, inclusive, there is shown a root of the double T-type; and, in Fig. 7, there is shown a root having lateral serrations. These alloys may have an inherent or material damping of only $1/50$ of stainless or 12 per cent chrome steel; however, the improvement in root damping afforded by going to multiple ribs or serrations at each root side makes possible substantial improvement in the total damping. If the material damping for 12 per cent chrome steel is assumed to be 1, then that for the high-temperature-resisting alloy steel would be around .02. As root damping for the single T root approximates .010, then it is apparent that the total damping, for the single T-root type would be 1.10 for the chrome steel and .12 for the high-temperature-resisting alloy. By going from the single T-type root to the serrated type, root damping is increased from .010 to 9.00, with the result that the total damping for 12 per cent chrome steel is 10.00 and, for the high-temperature-resisting alloy, 9.02. Therefore, the very much smaller inherent or material damping for the high-temperature-resisting alloy as compared to 12 per cent chrome steel is compensated to a very large extent by having a blade root of the serrated type, with the result that blades made from the high-temperature-resisting alloy have nearly as great total damping as the 12 per cent chrome steel blades.

From the foregoing, it will be apparent that, by the use of the method described, blading may be precision cast with the blade portions having the surfaces thereof finished and with the root portions formed to fit blade-holding grooves. As it is impractical to precision cast blading with the root portions dimensioned to fit accurately a blade-holding groove, it is necessary to resort to subsequent treatment of the root portions to provide for accurate fitting of the latter with respect to the blade-holding grooves. Therefore, each blade is cast with a root portion which is slightly oversize. To finish the blades so formed, the root portions are heated sufficiently for plastic deformation and then are subjected to the effect of forming or forging dies in order to dimension and shape the root portion conformably to its blade-holding groove. The procedure of heating and effecting the slight amount of plastic deformation is advantageous in that the danger of weakening of a blade because of machining or grinding away cast surfaces is avoided, proper shaping and dimensioning of each root portion is facilitated, and the manufacture of blading from materials difficult to forge or machine is made practicable.

What is claimed is:

1. In the process of manufacturing blades for turbines, compressors and the like, from a high-temperature-resisting alloy which is non-forgeable but susceptible of a slight amount of plastic deformation and which process comprises forming each blade from such alloy with a root portion, which is slightly oversize and has its blade-groove-wall-engaging surfaces conforming approximately to those of its blade groove walls, by casting in a mold provided with a cavity having at least the blade portion boundary surface thereof unitary, smooth and uninterrupted by joint lines so that the cast blade portion surfaces are finished, smooth and suitable for defining fluid flow passages, heating the oversize root portion to a temperature suitable for slight plastic deformation, and plastically deforming the cast root portion to finished size and shape by application, to the blade-groove-wall-engaging surfaces thereof, of forming dies, having forming surfaces conforming to the blade-groove-wall surfaces and which differ from the cast blade-groove-wall engaging surfaces only within the narrow tolerance limits for plastic deformation of the alloy, to effect the slight amount of deformation thereof required for the cast surfaces to conform to the die surfaces to produce a root portion to suit the width of the blade groove and fit the side walls of the latter.

2. In the process of manufacturing blades for turbines, compressors and the like, from a high-temperature-resisting alloy which is non-forgeable but susceptible of a slight amount of plastic deformation and which process comprises forming each blade from such alloy with an oversize root portion provided with lateral ribs by casting in a mold provided with a cavity having at least the blade portion boundary surfaces thereof unitary, smooth and uninterrupted by joint lines so that the cast blade portion surfaces are finished, smooth and suitable for defining fluid flow passages, heating each cast root portion sufficiently to provide for slight plastic deformation, and plastically deforming the root portion by means of forming dies to properly dimension and shape the latter with the lateral ribs or projections having circumferentially-curved abutment surfaces and with the latter properly located for engagement with blade groove ribs.

FLOYD T. HAGUE.

REFERENCES CITED

The following references are of record in the file of this patent:

UNITED STATES PATENTS

| Number | Name | Date |
|---|---|---|
| 1,336,576 | Nichols | Apr. 13, 1920 |
| 1,772,215 | Grant | Aug. 5, 1930 |

FOREIGN PATENTS

| Number | Country | Date |
|---|---|---|
| 480,404 | Great Britain | Feb. 22, 1938 |
| 2,241 | Great Britain | 1880 |